United States Patent
Hayashi et al.

(10) Patent No.: US 12,087,939 B2
(45) Date of Patent: Sep. 10, 2024

(54) LITHIUM ION SECONDARY BATTERY

(71) Applicant: Murata Manufacturing Co., Ltd., Nagaokakyo (JP)

(72) Inventors: Takeshi Hayashi, Nagaokakyo (JP); Junji Tsunematsu, Nagaokakyo (JP); Masahiro Homae, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 881 days.

(21) Appl. No.: 16/953,518

(22) Filed: Nov. 20, 2020

(65) Prior Publication Data

US 2021/0075004 A1 Mar. 11, 2021

Related U.S. Application Data

(63) Continuation of application No. PCT/JP2019/021787, filed on May 31, 2019.

(30) Foreign Application Priority Data

Jun. 13, 2018 (JP) .................................. 2018-112462

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/131* (2013.01); *H01M 4/5825* (2013.01);
(Continued)

(58) Field of Classification Search
CPC .... H01M 4/366; H01M 4/131; H01M 4/5825; H01M 4/625; H01M 10/0525;
(Continued)

(56) References Cited

U.S. PATENT DOCUMENTS 6,656,635 B2 12/2003 Okawa et al.
7,851,092 B2 * 12/2010 Amine .................. H01M 4/366
429/212

(Continued)

FOREIGN PATENT DOCUMENTS

JP 2003203628 A 7/2003
JP 3997702 B2 10/2007
(Continued)

OTHER PUBLICATIONS

Wikipedia [Ethylene Carbonate] (Year: 2023).*

(Continued)

*Primary Examiner* — Cynthia H Kelly
*Assistant Examiner* — Niara Trant
(74) *Attorney, Agent, or Firm* — ArentFox Schiff LLP

(57) ABSTRACT

A lithium ion secondary battery that includes: a positive electrode having a positive electrode active material capable of storing and releasing lithium ions, the positive electrode active material containing positive electrode active material grains having a coating layer containing a carbon compound having an acid functional group, and an amount of the acid functional group in a composite including the positive electrode active material and the coating layer is 0.004 mmol/g to 0.0062 mmol/g; a negative electrode having a negative electrode active material capable of storing and releasing lithium ions; a separator interposed between the positive electrode and the negative electrode; and a non-aqueous electrolyte containing a polar solvent having a relative permittivity of 20 or more.

10 Claims, 1 Drawing Sheet

(51) Int. Cl.
  *H01M 4/131* (2010.01)
  *H01M 4/58* (2010.01)
  *H01M 4/62* (2006.01)
  *H01M 10/0525* (2010.01)
  *H01M 10/0569* (2010.01)

(52) U.S. Cl.
  CPC ....... *H01M 4/625* (2013.01); *H01M 10/0525* (2013.01); *H01M 10/0569* (2013.01); *H01M 2004/028* (2013.01); *H01M 2300/0028* (2013.01)

(58) Field of Classification Search
  CPC ....... H01M 10/0569; H01M 2004/028; H01M 2300/0028; H01M 2004/021; Y02E 60/10
  See application file for complete search history.

(56) References Cited

U.S. PATENT DOCUMENTS

| | | | | |
|---|---|---|---|---|
| 8,075,861 | B2* | 12/2011 | Tian | .................... H01M 4/5825 |
| | | | | 423/306 |
| 9,595,738 | B2* | 3/2017 | Yoon | .................... H01M 4/625 |
| 2002/0106564 | A1 | 8/2002 | Okawa et al. | |
| 2011/0008233 | A1* | 1/2011 | Miyanaga | ........... H01M 4/5825 |
| | | | | 423/306 |
| 2013/0295463 | A1* | 11/2013 | Matsuda | ............... H01M 4/505 |
| | | | | 427/122 |
| 2017/0149061 | A1* | 5/2017 | Kim | ....................... H01M 4/366 |

FOREIGN PATENT DOCUMENTS

| | | |
|---|---|---|
| WO | 2012049723 A1 | 4/2012 |
| WO | 2012098970 A1 | 7/2012 |
| WO | 2014175350 A1 | 10/2014 |

OTHER PUBLICATIONS

International Search Report Issued for PCT/JP2019/021787, date of mailing Aug. 20, 2019.

Written Opinion of the International Searching Authority issued for PCT/JP2019/021787, date of mailing Aug. 20, 2019.

* cited by examiner

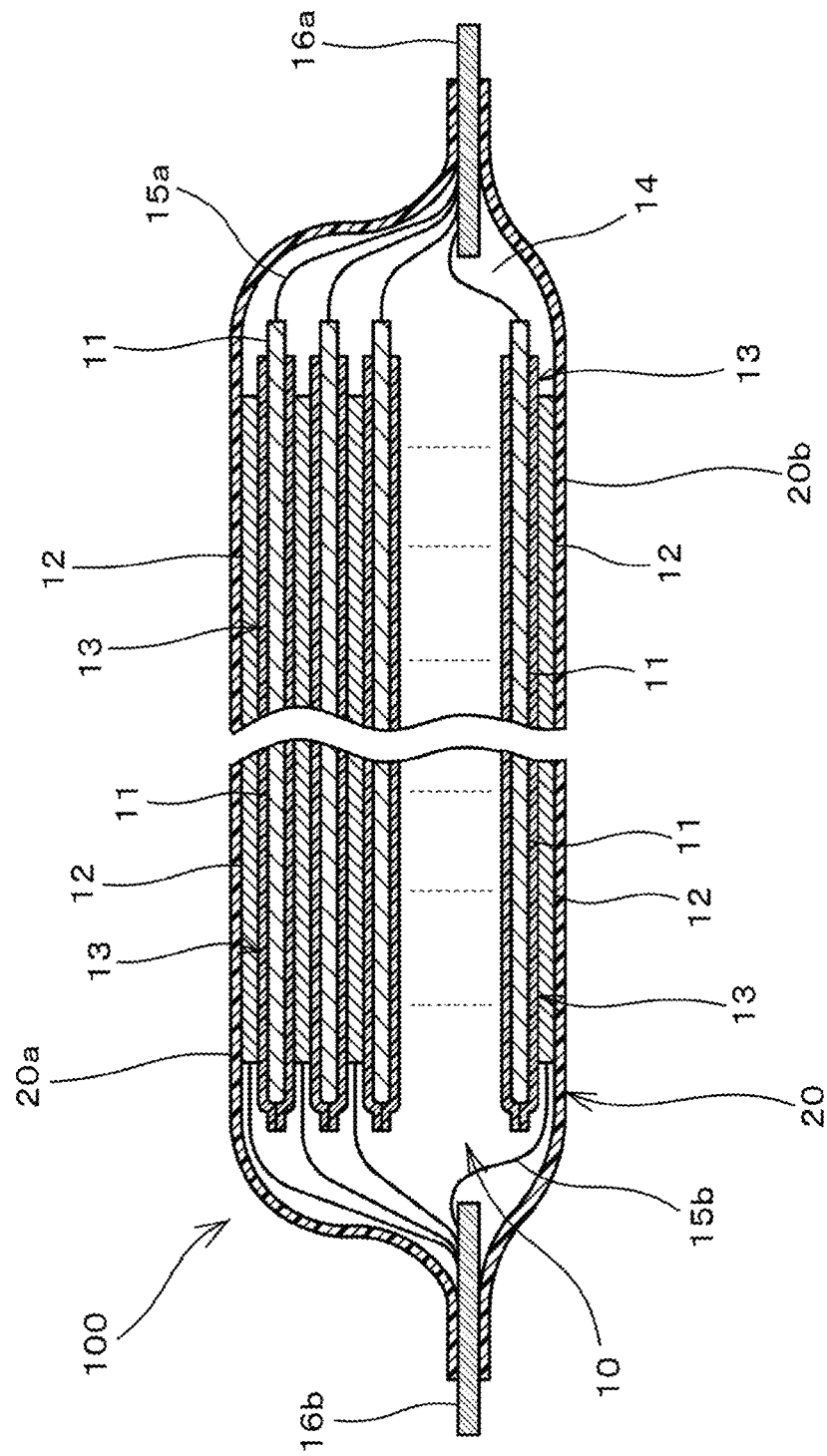

LITHIUM ION SECONDARY BATTERY

CROSS REFERENCE TO RELATED APPLICATIONS

The present application is a continuation of International application No. PCT/JP2019/021787, filed May 31, 2019, which claims priority to Japanese Patent Application No. 2018-112462, filed Jun. 13, 2018, the entire contents of each of which are incorporated herein by reference.

FIELD OF THE INVENTION

The present invention relates to a lithium ion secondary battery.

BACKGROUND OF THE INVENTION

Lithium ion secondary batteries are widely used as, for example, a power supply for small-sized electronic devices and a vehicle-driving power supply because of their high energy density.

As one of such lithium ion secondary batteries, Patent Document 1 discloses a lithium ion secondary battery using olivine-type lithium phosphate oxide as a positive electrode active material. As described in Patent Document 1, in view of the poor electron conductivity of the olivine-type lithium phosphate oxide, a carbon composite of the olivine-type lithium phosphate oxide is used as the positive electrode active material, and the thickness of a positive electrode active material layer is optimized to achieve both load characteristics and a battery capacitance.

In Patent Document 2, a lithium ion secondary battery is described, in which a conductive path composed of carbon is incorporated in a positive electrode active material grain containing olivine-type lithium phosphate oxide in order to improve the conductivity of the olivine-type lithium phosphate oxide.

Patent Document 1: Japanese Patent No. 3997702
Patent Document 2: Japanese Patent Application Laid-Open No. 2003-203628

SUMMARY OF THE INVENTION

However, as in the lithium ion secondary battery described in Patent Document 1, only by optimizing the thickness of the positive electrode active material layer, the conductivity of each positive electrode active material grain does not change, which has room for improvement in the load characteristics.

Since Patent Document 2 does not describe the detailed state of the carbon configuring the conductive path, it is unclear whether the conductive path is sufficient. Therefore, the load characteristics cannot be said to be sufficiently improved when the conductive path incorporated in the positive electrode active material grain is insufficient.

It is known that when the wettability of a non-aqueous electrolyte with respect to a positive electrode active material is poor, load characteristics are lowered. However, in Patent Documents 1 and 2, no consideration is given to the wettability of the non-aqueous electrolyte with respect to the positive electrode active material, and it is considered that sufficient load characteristics may not be necessarily obtained only by satisfying the requirements shown in Patent Documents 1 and 2.

The present invention solves the above problems, and an object of the present invention is to provide a lithium ion secondary battery capable of improving load characteristics.

A lithium ion secondary battery of the present invention includes: a positive electrode having a positive electrode active material capable of storing and releasing lithium ions, the positive electrode active material containing positive electrode active material grains having a coating layer containing a carbon compound having an acid functional group, and an amount of the acid functional group in a composite including the positive electrode active material and the coating layer is 0.004 mmol/g to 0.0062 mmol/g; a negative electrode having a negative electrode active material capable of storing and releasing lithium ions; a separator interposed between the positive electrode and the negative electrode; and a non-aqueous electrolyte containing a polar solvent having a relative permittivity of 20 or more.

A proportion of the coating layer in the composite may be 0.1% by weight to 5% by weight.

The composite may have a specific surface area of 9.0 $m^2/g$ or more.

The positive electrode active material may be an olivine-type lithium phosphate compound represented by a chemical formula $Li_xM_yP_zO_{4-\delta}$, in which:
  $0.5<x/y<1.5$ and $y/z>1$;
  $\delta$ is an oxygen deficiency amount; and
  M contains at least one of Fe, Mn, Co, and Ni.

In the present invention, the coating layer containing the carbon compound is formed on the surface of the positive electrode active material grain; the acid functional group is contained in the coating layer; the amount of the acid functional group in the composite including the positive electrode active material and the coating layer is 0.004 mmol/g to 0.0062 mmol/g; and the non-aqueous electrolyte contains the polar solvent having a relative permittivity of 20 or more. This makes it possible to achieve both improvement in electron conductivity provided by the coating layer containing the carbon compound, and improvement in the wettability of the non-aqueous electrolyte with respect to the positive electrode active material. Thereby, the load characteristics of the lithium ion secondary battery can be improved.

BRIEF EXPLANATION OF THE DRAWING

The FIGURE a cross-sectional view of a lithium ion secondary battery according to an embodiment of the present invention.

DETAILED DESCRIPTION OF THE INVENTION

Hereinafter, the characteristics of the present invention will be more specifically described with reference to embodiments of the present invention.

Hereinafter, a lithium ion secondary battery having a structure in which a stacked body formed by alternately stacking a plurality of positive electrodes and a plurality of negative electrodes with a separator interposed therebetween and a non-aqueous electrolyte are housed in an exterior body will be described as an example.

The FIGURE a cross-sectional view of a lithium ion secondary battery 100 according to an embodiment of the present invention. The lithium ion secondary battery 100 has a structure in which a stacked body 10 formed by alternately stacking a plurality of positive electrodes 11 and a plurality of negative electrodes 12 with a separator 13 interposed therebetween and a non-aqueous electrolyte 14 are housed in a laminate case 20. That is, the lithium ion secondary battery 100 includes the positive electrode 11, the negative electrode 12, the separator 13, and the non-aqueous electrolyte 14.

The laminate case 20, which is an exterior body, is formed by joining peripheral portions of a pair of laminate films 20a and 20b by thermal compression bonding.

The non-aqueous electrolyte 14 housed in the laminate case 20 contains a polar solvent having a relative permittivity of 20 or more. As the non-aqueous electrolyte 14 containing the polar solvent having a relative permittivity of 20 or more, for example, a non-aqueous electrolytic solution containing ethylene carbonate having a relative permittivity of 90 can be used.

A positive electrode terminal 16a is led to the outside from one end side of the laminate case 20, and a negative electrode terminal 16b is led to the outside from the other end side. The plurality of positive electrodes 11 are connected to the positive electrode terminal 16a through lead wires 15a. The plurality of negative electrodes 12 are connected to the negative electrode terminal 16b through lead wires 15b.

The positive electrode 11 has a positive electrode active material capable of storing and releasing lithium ions. More specifically, the positive electrode 11 has a positive electrode mixture layer containing the positive electrode active material, and a positive electrode current collector. The positive electrode mixture layer is formed on each of both surfaces of the positive electrode current collector. The positive electrode current collector is, for example, a metal foil such as aluminum.

The positive electrode active material is, for example, an olivine-type lithium phosphate compound represented by a chemical formula $Li_xM_yP_zO_{4-\delta}$, in which: $0.5<x/y<1.5$ and $y/z>1$ are set; $\delta$ is an oxygen deficiency amount; and M contains at least one of Fe, Mn, Co, and Ni. As such an olivine-type lithium phosphate compound, for example, lithium iron phosphate ($LiFePO_4$ (also referred to as LFP)) can be used. A part of a Fe site of $LiFePO_4$ may be substituted with at least one element selected from the group consisting of Mg, Ca, Ti, Cr, Zr, Zn, and Nb. A part of a Li site may be substituted with Na, and a part of a P site may be substituted with Si.

The positive electrode mixture layer may contain a conductive auxiliary agent and a binder in addition to the positive electrode active material. The positive electrode active material is preferably contained in a proportion of 50% by weight to 99% by weight in the positive electrode mixture layer.

In the present embodiment, a coating layer containing a carbon compound is formed on the surface of a positive electrode active material grain configuring the positive electrode active material. An acid functional group is contained in the coating layer. The positive electrode active material and the coating layer form a positive electrode active material composite (hereinafter, simply referred to as composite).

The entire surface of the positive electrode active material grain may not be coated with the coating layer. For example, carbon having no acid functional group may be contained in the coating layer.

The composite can be produced, for example, by heat-treating a mixture obtained by mixing a constituent material of the positive electrode active material with a reducing carbohydrate in an inert atmosphere. When the mixture is heat-treated, a heat treatment atmosphere, a heating temperature, and a heating time and the like are adjusted so that a carbon compound having an acid functional group can be obtained after the heat treatment. As the reducing carbohydrate, for example, saccharides such as glucose, fructose, sucrose, and dextrin, cellulose, and those having a reducing functional group such as an aldehyde group or a ketone group can be used.

The type of the acid functional group is not particularly limited, but it is preferably at least one selected from the group consisting of a carboxyl group, a hydroxyl group, a carbonyl group, and a quinone group.

In the present embodiment, the amount of the acid functional group in the composite including the positive electrode active material and the coating layer is 0.004 mmol/g to 0.0062 mmol/g. The amount of the acid functional group satisfies the above requirements, and the polar solvent having a relative permittivity of 20 or more is contained in the non-aqueous electrolyte 14, which makes it possible to achieve both improvement in electron conductivity provided by the coating layer containing the carbon compound, and promotion of the storing and releasing of lithium ions provided by improvement in the wettability of the non-aqueous electrolyte 14 with respect to the positive electrode active material. As a result, the lithium ion secondary battery 100 of the present embodiment has load characteristics improved as compared with a conventional lithium ion secondary battery which does not have the above configuration.

Here, the case where a coating layer containing no acid functional group and composed of carbon, that is, a coating layer which satisfies no requirements of the present invention is formed on the surface of the positive electrode active material grain will be considered. In this case, the adhesion of carbon provides improved electron conductivity as compared with a structure in which carbon is not attached to a positive electrode active material grain. However, it is considered that the positive electrode active material grain is coated with the carbon containing no acid functional group, so that the positive electrode active material does not smoothly store and release lithium ions.

However, in the lithium ion secondary battery 100 according to the present embodiment, the coating layer containing a carbon compound having an acid functional group is formed on the surface of the positive electrode active material grain; the content of the acid functional group is set to the above amount; and the polar solvent having a relative permittivity of 20 or more is contained in the non-aqueous electrolyte 14, which makes it possible to achieve both improvement in electron conductivity and improvement in the wettability of the non-aqueous electrolyte 14 with respect to the positive electrode active material.

The proportion of the coating layer in the composite is preferably 0.1% by weight to 5% by weight. The proportion of the coating layer in the composite is set to 0.1% by weight to 5% by weight, whereby an electron conduction network is efficiently formed through the coating layer, which can reduce a lithium diffusion distance inside the positive electrode active material having high resistance. Therefore, the load characteristics of the lithium ion secondary battery 100 can be improved. The proportion of the coating layer in the composite is more preferably 1% by weight to 2% by weight in order to further reduce the lithium diffusion distance inside the positive electrode active material to further improve the load characteristics.

The composite preferably has a specific surface area of 9.0 $m^2$/g or more. The specific surface area of the composite is set to 9.0 $m^2$/g or more, whereby the lithium diffusion distance inside the positive electrode active material can be reduced to improve the load characteristics. The composite more preferably has a specific surface area of 10 m²/g to 13 m²/g in order to further reduce the lithium diffusion distance inside the positive electrode active material to further improve the load characteristics.

The negative electrode 12 has a negative electrode active material capable of storing and releasing lithium ions. More specifically, the negative electrode 12 has a negative electrode mixture layer containing the negative electrode active material, and a negative electrode current collector. The negative electrode mixture layer is formed on each of both surfaces of the negative electrode current collector.

There is no particular limitation on the type of the negative electrode active material, and for example, a carbon-based compound such as graphite, hard carbon, and soft carbon, lithium titanate, and an alloy-based substance containing at least one selected from the group consisting of a metal oxide having a composition represented by $MO_x$ (M is at least one element selected from the group consisting of Ti, Si, Sn, Cr, Fe, and Mo, and x is a numerical value within a range of $0.9 \leq x \leq 2.0$), silicon, silicon oxide, a silicon-containing alloy, a silicon-containing compound, tin, tin oxide, a tin-containing alloy, and a tin-containing compound can be used.

The negative electrode current collector is, for example, a metal foil composed of copper or the like. The negative electrode mixture layer may contain a conductive auxiliary agent and a binder in addition to the negative electrode active material.

The separator 13 is interposed between the positive electrode 11 and the negative electrode 12. As the separator 13, various separators which can be used in the lithium ion secondary battery can be used without particular limitation. Although the separator 13 shown in the FIGURE has a bag-like shape, it may have a sheet shape or may have a zigzag folded shape.

EXAMPLES (Measurement of Amount of Acid Functional Group)

As a positive electrode active material, a lithium iron phosphate powder (hereinafter referred to as LFP powder) in which a coating layer containing a carbon compound having an acid functional group was formed on the surface of a lithium iron phosphate grain was prepared. The lithium iron phosphate grain, which had a surface including the coating layer formed thereon and was a composite, had an average particle diameter D50 of 1 μm to 11 μm, and a specific surface area of 10 m²/g to 12 m²/g.

The amount of the acid functional group contained in the coating layer of the prepared LFP powder was measured by a back titration method. The back titration method is a method in which the LFP powder is mixed with a basic solution having a known concentration to determine an amount of a basic solution reacted by titrating the LFP powder and an unreacted basic solution with an acidic solution, and the amount of the acid functional group is determined from a reacted base amount.

Specifically, after 3 g of an LFP powder was weighed in a case, and stabilized in a thermo-hygrostat at a temperature of 25° C. and a humidity of 50% for 6 hours or more, 30 ml of a solution obtained by adding pyridine to methyl isobutyl ketone (MIBK) as a basic solution so that a pyridine concentration was set to 0.01 mol/L was added to the case, and the case was tightly sealed, followed by ultrasonically dispersing for 1 hour with an ultrasonic cleaner. The dispersion liquid was centrifuged, and 10 ml of the separated supernatant liquid was diluted with MIBK, and titrated with an MIBK solution of perchloric acid of 0.01 mol/L. From the amount of pyridine consumed by the acid functional group on the LFP surface, the amount of the acid functional group in the composite (acid point amount) and the amount of the acid functional group in the coating layer (acid point amount) were determined.

From the amount of lithium iron phosphate when producing the LFP powder which is the composite, the amount of the positive electrode active material in the composite, and the amount of the coating layer in the composite can be determined in advance. That is, if the amount of the acid functional group in the composite can be determined, the amount of the acid functional group in the coating layer can also be determined.

Here, as shown in Table 1 to be described later, seven types of LFP powders in which the amounts of the acid functional group in the composite, and the amounts of the carbon compound in the composite were different were prepared, and seven types of batteries for evaluating load characteristics were produced by a method to be described below.

(Production of Positive Electrode)

Subsequently, in addition to the above-described LFP powder, acetylene black (AB) as a conductive auxiliary agent, and polyvinylidene fluoride (PVdF) as a binder were prepared. These materials were dispersed in N-methyl-2-pyrrolidone (NMP) so that the weight ratio of LFP powder:AB:PVdF was 85:10:5 to produce a positive electrode slurry.

The positive electrode slurry was uniformly applied to both surfaces of a strip-shaped aluminum foil having a thickness of 20 μm using a die coater, and dried. The resulting layer was compressed so as to have a density of 2.0 g/cm³ using a roll press machine, and the resultant was then cut into a size of 50 mm×50 mm to produce a positive electrode. The thickness of a positive electrode mixture layer was set to be about 25 μm.

(Production of Negative Electrode)

Subsequently, natural graphite as a negative electrode active material and PVdF as a binder were prepared. These materials were dispersed in N-methyl-2-pyrrolidone (NMP) so that the weight ratio of natural graphite:PVdF was 95:5 to produce a negative electrode slurry.

The produced negative electrode slurry was uniformly applied to both surfaces of a strip-shaped copper foil having a thickness of 15 μm using a die coater, and dried. The coating amount of the negative electrode slurry was adjusted so that a negative electrode capacitance was 1.8 times of a positive electrode capacitance. The resulting layer was compressed so as to have a density of 1.3 g/cm³ using a roll press machine, and the resultant was then cut into a size of 52 mm×52 mm to produce a negative electrode. The thickness of a negative electrode mixture layer was set to be about 25 μm.

(Production of Electrolytic Solution)

Subsequently, a mixed solvent was prepared, in which the volume ratio of ethylene carbonate (EC) having a relative permittivity of 90 and ethyl methyl carbonate (EMC) having a relative permittivity of 2.8 was EC:EMC=25:75. Then, 1 mol of lithium hexafluorophosphate ($LiPF_6$) per 1 liter of the solvent was dissolved in the prepared mixed solvent, and vinylene carbonate (VC) was added thereto to produce a non-aqueous electrolytic solution. The amount of vinylene carbonate added was adjusted so that the proportion of the vinylene carbonate to the produced non-aqueous electrolytic solution was 1.0% by weight.

(Production of Battery)

A stacked battery element was produced by alternately stacking a plurality of positive electrodes and a plurality of negative electrodes produced by the above-described method with a separator interposed therebetween. A microporous polypropylene film having a thickness of 20 μm was used as the separator.

Subsequently, current collection leads for connection to external connection lines were ultrasonically welded to the produced battery element. The battery element was housed in a bag-shaped exterior body composed of aluminum laminate produced by thermally welding three sides. At this time, the current collection leads were projected to the outside of the exterior body.

Finally, 1.6 g of the non-aqueous electrolytic solution produced by the above-described method was injected into the bag-shaped exterior body, and opened one side was then closed and sealed to produce a battery.

As described above, seven types of LFP powders in which the amounts of the acid functional group in the composite, and the amounts of the carbon compound in the composite were different were used to produce seven types of batteries shown in Table 1 to be described later.

(First Charging/Discharging Condition)

Each produced battery was charged at a constant current of 0.2 CA under a temperature condition of 25° C. until the battery voltage reached 3.8 V, and further charged at a constant voltage of 3.8 V for 10 hours.

Then, under a temperature condition of 25° C., each battery was discharged at a constant current of 1 CA until the voltage of the battery reached 2.5 V.

(Aging Treatment)

Each produced battery was charged at a constant current of 1 CA under a temperature condition of 25° C. until the battery voltage reached 3.8 V, and further charged at a constant voltage of 3.8 V until the current attenuated down to 1/50 CA. Then, under a temperature condition of 55° C., an aging treatment was performed for 1 week.

When gas was generated in the exterior body during the first charge/discharge and the aging treatment, a degassing treatment was performed to release the gas to the outside of the exterior body.

(Output Characteristic Test)

<Inspection of Capacitance>

Each produced battery was charged at a constant current of 1 CA under a temperature condition of 25° C. until the battery voltage reached 3.5 V, and further charged at a constant voltage of 3.5 V until the current attenuated down to 1/50 CA.

Then, under a temperature condition of 55° C., each battery was discharged at a constant current of 1 CA until the voltage of the battery reached 2.5 V, to obtain a discharge capacitance. The discharge capacitance was taken as a battery capacitance. Table 1 shows the capacitance of each battery.

<Inspection of Load Characteristics>

Each produced battery was charged under a temperature condition of 25° C. until the state of charge (SOC) reached 50%, and a direct current resistivity was then calculated from an achieved voltage when the battery was charged at a constant current of 10 C for 20 seconds under a temperature condition of 0° C. A value obtained by normalizing the calculated direct current resistivity by the total area of the positive electrode was taken as an index of load characteristics. Table 1 shows the direct current resistivity (DCR) normalized by the total area of the positive electrode for each battery.

TABLE 1

| SAMPLE NUMBER | AMOUNT OF ACID FUNCTIONAL GROUP IN COMPOSITE (mmol/g) | AMOUNT OF CARBON COMPOUND IN COMPOSITE (wt %) | DIRECT CURRENT RESISTIVITY (DCR) ($\Omega cm^2$) | RESISTANCE EVALUATION | CAPACITANCE (mAh) |
|---|---|---|---|---|---|
| 1 | 0.0040 | 1.3 | 68 | GOOD | 121.5 |
| 2 | 0.0045 | 1.2 | 67 | GOOD | 120.9 |
| 3 | 0.0062 | 1.4 | 66 | GOOD | 120.8 |
| 4 | 0.0049 | 1.4 | 67 | GOOD | 121.4 |
| 5 | 0.005 | 2.0 | 67 | GOOD | 117.4 |
| *6 | 0.0037 | 0.9 | 87 | POOR | 128.6 |
| *7 | 0.0119 | 1.2 | 72 | POOR | 121.4 |

In Table 1, for seven types of batteries in which the amounts of the acid functional group in the composite, and the amounts of the carbon compound were different, the amount of the acid functional group in the composite, the amount of the carbon compound in the composite, and the direct current resistivity (DCR), resistance evaluation, and battery capacitance of each of the batteries are shown. Samples with Samples Nos. 1 to 5 are evaluation cells satisfying the requirements of the present invention in which the amount of the acid functional group in the composite is 0.004 mmol/g to 0.0062 mmol/g. Meanwhile, samples with Samples Nos. 6 and 7 marked with * are comparative cells which do not satisfy the requirements of the present invention.

As shown in Table 1, the direct current resistivity of the comparative cell of Sample No. 6 which did not satisfy the requirements of the present invention was 87 $\Omega cm^2$, and the direct current resistivity of the comparative cell of Sample No. 7 was 72 $\Omega cm^2$, but the direct current resistivity of each of the evaluation cells of Sample Nos. 1 to 5 satisfying the requirements of the present invention was 68 $\Omega cm^2$ or less. Therefore, the resistance evaluation of each of the evaluation cells of Sample Nos. 1 to 5 satisfying the requirements of the present invention was taken as "good", and the resistance evaluation of each of the comparative cells of Sample Nos. 6 and 7 which did not satisfy the requirements of the present invention was taken as "poor".

That is, in the lithium ion secondary battery, the coating layer containing the carbon compound having the acid functional group is formed on the surface of the positive electrode active material grain; the requirements in which the amount of the acid functional group in the composite is 0.004 mmol/g to 0.0062 mmol/g are satisfied, and the polar solvent having a relative permittivity of 20 or more is contained in the non-aqueous electrolyte. The lithium ion secondary battery has a lower direct current resistivity and higher load characteristics than those of a conventional lithium ion secondary battery which does not satisfy the above requirements.

Although not shown in Table 1, it was found that, in the battery in which the solvent having a relative permittivity of 20 or more is not contained in the non-aqueous electrolyte, the wettability of the electrolytic solution with respect to the positive electrode active material is poor and the load characteristics are low even when the requirements in which the amount of the acid functional group in the composite is 0.004 mmol/g to 0.0062 mmol/g are satisfied.

That is, the amount of the acid functional group in the composite is 0.004 mmol/g to 0.0062 mmol/g, and the condition that the non-aqueous electrolyte contains the polar solvent having a relative permittivity of 20 or more is satisfied. This makes it possible to achieve both improvement in electron conductivity provided by the coating layer containing the carbon compound, and promotion of the storing and releasing of lithium ions provided by improvement in the wettability of the non-aqueous electrolyte with respect to the positive electrode active material, to improve the load characteristics of the lithium ion secondary battery.

The present invention is not limited to the above embodiments, and various applications and modifications can be added within the scope of the present invention.

In the above-described embodiments, a lithium ion secondary battery having a structure in which a stacked body formed by alternately stacking a plurality of positive electrodes and a plurality of negative electrodes with a separator interposed therebetween and a non-aqueous electrolyte are housed in an exterior body has been described as an example. However, the structure of the lithium ion secondary battery according to the present invention is not limited to the above structure. For example, the lithium ion secondary battery may have a structure in which a wound body formed by winding a positive electrode and a negative electrode stacked with a separator interposed therebetween and a non-aqueous electrolyte are housed in an exterior body. The exterior body may be not a laminate case, but a metal can.

The use of the olivine-type lithium phosphate compound as the positive electrode active material has been described as an example. However, the positive electrode active material is not limited to the olivine-type lithium phosphate compound. When the present invention is applied by using the olivine-type lithium phosphate compound as the positive electrode active material, the disadvantage of the olivine-type lithium phosphate compound having high lithium diffusion resistance and low in-grain electron conductivity can be compensated to effectively improve load characteristics. That is, the electron conductivity can be improved by attaching the carbon compound to the surface of the olivine-type lithium phosphate compound. At this time, the configuration of the present invention can achieve both improvement in the electron conductivity, and improvement in the wettability of the non-aqueous electrolyte with respect to the positive electrode active material to effectively improve the load characteristics.

The amount of the acid functional group in the composite can be determined not only from the composite used in the manufacture of the battery but also from the positive electrode of the manufactured battery. For example, the amount of the acid functional group can be determined by the following method.

First, a positive electrode mixture layer was peeled off from a positive electrode of a battery to collect a powdered positive electrode powder, and the collected positive electrode powder was added to N-methyl-2-pyrrolidone (NMP) to dissolve and remove PVdF as a binder. NMP is further added to the powder from which the PVdF has been removed and the mixture is centrifuged to separate a conductive auxiliary agent and a composite from each other. An amount of an acid functional group is determined using the composite obtained by the separation. The amount of the acid functional group can be determined by the above-described back titration method.

DESCRIPTION OF REFERENCE SYMBOLS

10: stacked body
11: positive electrode
12: negative electrode
13: separator
14: non-aqueous electrolyte
20: laminate case
100: lithium ion secondary battery

The invention claimed is:

1. A lithium ion secondary battery comprising:
 a positive electrode having a positive electrode active material capable of storing and releasing lithium ions, the positive electrode active material containing positive electrode active material grains having a coating layer containing a carbon compound having an acid functional group, an amount of the acid functional group in a composite including the positive electrode active material and the coating layer is 0.004 mmol/g to 0.0062 mmol/g, and a proportion of the coating layer in the composite is 0.1% by weight to 5% by weight;
 a negative electrode having a negative electrode active material capable of storing and releasing lithium ions;
 a separator interposed between the positive electrode and the negative electrode; and
 a non-aqueous electrolyte containing a polar solvent having a relative permittivity of 20 or more.

2. The lithium ion secondary battery according to claim 1, wherein a proportion of the coating layer in the composite is 1% by weight to 2% by weight.

3. The lithium ion secondary battery according to claim 1, wherein the composite has a specific surface area of 9.0 m$^2$/g or more.

4. The lithium ion secondary battery according to claim 3, wherein the specific surface area of the composite is 10 m$^2$/g to 13 m$^2$/g.

5. The lithium ion secondary battery according to claim 1, wherein the positive electrode active material is an olivine-type lithium phosphate compound represented by $Li_xM_yP_zO_{4-\delta}$, wherein:
 $0.5 < x/y < 1.5$ and $y/z > 1$;
 $\delta$ is an oxygen deficiency amount; and
 M contains at least one of Fe, Mn, Co, and Ni.

6. The lithium ion secondary battery according to claim 1, wherein the non-aqueous electrolyte is a non-aqueous electrolytic solution containing ethylene carbonate having a relative permittivity of 90.

7. The lithium ion secondary battery according to claim 5, wherein the olivine-type lithium phosphate compound is $LiFePO_4$.

8. The lithium ion secondary battery according to claim 7, wherein at least one of (1) a part of the Fe is substituted with at least one element selected from Mg, Ca, Ti, Cr, Zr, Zn, and Nb, (2) a part of the Li is substituted with Na, and (3) a part of the P is substituted with Si.

9. The lithium ion secondary battery according to claim 1, wherein the positive electrode includes a positive electrode mixture layer containing the positive electrode active material, and the positive electrode active material is contained in a proportion of 50% by weight to 99% by weight in the positive electrode mixture layer.

10. The lithium ion secondary battery according to claim 1, wherein the acid functional group is at least one of a carboxyl group, a hydroxyl group, a carbonyl group, and a quinone group.

* * * * *